(12) United States Patent
Agnihotri et al.

(10) Patent No.: US 8,126,763 B2
(45) Date of Patent: Feb. 28, 2012

(54) AUTOMATIC GENERATION OF TRAILERS CONTAINING PRODUCT PLACEMENTS

(75) Inventors: Lalitha Agnihotri, Tarrytown, NY (US); Mauro Barbieri, Eindhoven (NL); Nevenka Dimitrova, Bangalore (IN)

(73) Assignee: Koninklijke Philips Electronics N.V., Eindhoven (NL)

( * ) Notice: Subject to any disclaimer, the term of this patent is extended or adjusted under 35 U.S.C. 154(b) by 973 days.

(21) Appl. No.: 11/814,086

(22) PCT Filed: Jan. 17, 2006

(86) PCT No.: PCT/IB2006/050172
§ 371 (c)(1),
(2), (4) Date: Apr. 30, 2008

(87) PCT Pub. No.: WO2006/077536
PCT Pub. Date: Jul. 27, 2006

(65) Prior Publication Data
US 2008/0221942 A1    Sep. 11, 2008

(30) Foreign Application Priority Data
Jan. 20, 2005   (EP) .................................... 05100353

(51) Int. Cl.
G06Q 10/00 (2006.01)
G06Q 30/00 (2006.01)
H04N 7/10 (2006.01)

(52) U.S. Cl. ......... 705/7.29; 705/7.33; 705/347; 725/34
(58) Field of Classification Search .................. None
See application file for complete search history.

(56) References Cited

U.S. PATENT DOCUMENTS

| | | | |
|---|---|---|---|
| 2002/0100042 A1* | 7/2002 | Khoo et al. | |
| 2003/0028432 A1* | 2/2003 | Troyansky et al. | |
| 2003/0065657 A1* | 4/2003 | Hashimoto et al. | |
| 2003/0152363 A1* | 8/2003 | Jeannin et al. | |
| 2003/0191816 A1* | 10/2003 | Landress et al. | 709/219 |
| 2004/0019524 A1* | 1/2004 | Marshall | |
| 2005/0033691 A1* | 2/2005 | Whewell et al. | 705/40 |

(Continued)

FOREIGN PATENT DOCUMENTS

WO    WO0124083 A2    4/2001

(Continued)

OTHER PUBLICATIONS

Barbieri et al: "Movie-In-A-Minute: Automatically Generated Video Previews"; Lecture Notes in Computer Science, Springer Verlag, New York, NY, vol. 3332, No. Part 2, Nov. 30, 2004, pp. 9-18, XP009050826.

(Continued)

Primary Examiner — Faris Almatrahi

(57) ABSTRACT

This invention relates to a method and computer system for automatic generation of trailers. More specifically it relates to a method for generating revenues from providers of content data. The method generally comprises the steps of finding product placement data in a super set of data. When these product placements have been found they are preferably matched with a user profile and segments, of the superset comprising these product placements with a positive match, are selected and merged into a subset of data. A counter may keep track of which product placement that has been chosen and how many times a product placement has been chosen and viewed. Based on the value of the counter an invoice is created.

16 Claims, 2 Drawing Sheets

U.S. PATENT DOCUMENTS

2006/0155398 A1\* 7/2006 Hoffberg et al. .................. 700/86
2009/0019061 A1\* 1/2009 Scannell, Jr. .................... 707/10

FOREIGN PATENT DOCUMENTS

WO WO2004047109 A1 6/2004

OTHER PUBLICATIONS

Oostveen et al: "Feature Extraction and a Database Strategy for Video Fingerprinting"; Lecture Notes in Computer Science, Springer Verlag, New York, NY, vol. 2314, Mar. 11, 2002, pp. 117-128, XP009017770.

Leinhart et al: "Video Abstracting"; Communications of the Association for Computing Machinery, ACM, New York, NY, vol. 40, No. 12, Dec. 1997, pp. 55-62, XP000765719.

Topic, M. "Streaming Media Demystified"; 2002, McGraw-Hill Telecom, ISBN 0-07-138877, pp. 280-281,304,340, XP002403449.

\* cited by examiner

AUTOMATIC GENERATION OF TRAILERS CONTAINING PRODUCT PLACEMENTS

The present invention generally relates to a method and computer system for automatic creation of trailers containing product placements. In particular it relates to a method for generating revenues from providers of content data.

Using the TV for promoting products has been very popular since many years. However companies that have been using films, TV programs and similar channels for marketing have had the problem that viewers might not see the product placements. The main reason, for this has been that many people see the commercials as a break for making sandwiches or going to the bathroom.

Marketing people came up with a idea that would promote a products in a film without the viewers leaving the room. The idea was to promote products by making actors in films and TV programs use products so that viewer would see them as a natural part of the film.

However the recent change and development in broadcasting technology, where Internet TV and pay per view has become increasingly popular, puts the providers of product placement in an even more difficult situation. Now viewers have an explosion of films to watch and may end up watching fewer and fewer as time to watch films is reduced. (Earlier there was lesser choice and everybody watched the Sunday evening film).

Thus, with the new technology viewers have more control and can pick and choose what they want from a variety of offerings.

This possibility for viewers results in reduced eyeballs for the product placement providers. Hence the return on the investment that providers of the product placements invests in these marketing channels is more or less wasted.

A solution on this problem would be very beneficial for the companies owning and/or managing these marketing media since they would be able to provide better service to the product placement providers. Furthermore it would also be very beneficial for the product placement providers since the product placements would be more exposed to viewers. Thus the providers of product placement would experience more "bang for the bucks".

One area that could be more exploited is trailers. Currently, there exist automatic methods to generate trailers of films recorded on home media servers, such as TiVo or the alike. Furthermore video and audio fingerprinting and matching is a known technology.

However, none of the prior art technologies provides a solution where the exposure time of a product placement is ensured without editing a film or TV program.

It is an object of the present invention to provide a method and system for increasing additional revenues generated by showing the viewers/users a trailer of a film or program comprising product placements.

It is an advantage of the present invention to provide a method and system for creating a subset of data designed for a specific customer from a superset of data.

It is further an advantage of the present invention to provide an electronic device for creating a subset of data comprising product placements from a superset of data.

According to a first aspect of the invention the above object and advantages are achieved by providing a method of creating a sub set of data comprising data segments from a superset of data, the superset comprising:
content data, and
content data tagged with metadata,
the method comprises the steps of:
based on the metadata, detecting data segments comprising at least the tagged content data in the superset,
selecting one or more data segments according to at least one user profile,
combine the one or more data segments so as to form a sub set of data.

In a second aspect of the invention, the above and other objects are fulfilled by a computer system for creating a sub set of data comprising data segments from a superset of data, the superset comprising content data and tagged content data, the computer system comprising:
an electronic device comprising a memory,
a database comprising at least one superset of data,
a computer network, and
at least one network connection,
wherein the electronic device is programmed to:
request data segments of the superset stored in the database over the network connection,
select at least one data segment comprising tagged content data, according to a user profile stored in the memory, and
combine the at least one data segment so as to form a sub set of data.

In a third aspect of the invention, the above and other objects are fulfilled by an electronic device comprising, at least one processor, at least one memory comprising one or more user profiles, at least one output, and at least one connection for receiving and/or sending data, the electronic device being programmed to:
request data comprising data segments further comprising tagged content data, via the connection for receiving data,
select at least one of the data segment according to the user profile,
combining at least one selected data segment so as to form a sub set of data, and providing the sub set of data to the output.

Thus the present invention allows for creating a sub set of data from a superset of data on any kind of electronic device and to display the subset of data on any kind of display. Hence the present invention provides means for e.g. creating a trailer from a film on a set top box or mobile phone or the alike.

By the present invention data segments comprising product placements are selected from the superset of data, so as to secure displaying the product placement data to a user/viewer and hereby provide a better service to the providers of the product placement data. Since the product placement will be exposed to a viewer the provider of the product placement will experience an increase in marketing of a product or service. Thus a broadcasting company providing this service helps the provider of the product placement to promote their products/services in a more efficient way and will therefore be able to invoice the provider of the product placement.

The superset may comprise content not only related to films. The creation of a subset may be based on different kinds of supersets of data, the content data in the superset may therefore be related to any of the following digital/analog media:
films,
games,
Tv,
radio,
Internet.

Thus content data may comprise many different kinds of data, such as MP3, MPEG-1, MPEG-2, QuickTime, MPV, and so forth.

The value of the counter that may be used when creating invoices preferably relates to an aggregated amount of time relating to the tagged content data.

In a second embodiment the value of the counter may relate to an aggregated number of times the tagged content data has been selected.

Furthermore a combination of these values may be used for creating an invoice to a content provider.

In order to design a sub set of data so that it suits a specific user/viewer a user profile comprising data about a user may be used, preferably the user profile comprises at least one of the following data about the user:
- gender,
- age,
- habits,
- area,
- time,
- content provider, and
- broadcaster settings (default settings)
- personality traits (e.g. introvert, extravert, etc.).

Preferably the tagged content data is product placement data. The product placement is tagged so that it is possible to classify it, compare it with a user profile and so that it is possible to find it in a superset of data.

Hence by classifying the product placement data it is possible to match the product placement data with a viewer, an area, culture of a viewer or area, language of a viewer and so forth.

Furthermore in a second embodiment the superset of data may comprise non-program data such as commercials and so forth. In these cases the method for creating a subset preferably comprise the following steps:
- detecting the non-program data, and
- while considering the detected non-program data, estimating a start and a stop time for the detected data segments in the superset, and
- based on the estimated start and stop time, combining the selected data segments so as to form a sub set of data.

In the case when fingerprint metadata is used in the method for finding a data segment the fingerprint metadata may be stored on a separate database. In this way the fingerprint metadata can be accessed online and used for creating subsets of data.

In another embodiment the fingerprint metadata may be a part of the superset so that it is sent along with the superset.

In a further embodiment the fingerprint metadata may be sent as a separate file together with the superset of data.

In the cases when fingerprint metadata may be used the fingerprint metadata preferably comprises:
- audio fingerprint data,
- video fingerprint data, and
- text fingerprint data, and the method for creating a subset may further comprise the steps of:
- text fingerprint matching,
- audio fingerprint matching, and
- visual fingerprint matching.

The method for generating revenues from providers as described in the first aspect of the invention may be combined with any of the methods for creating a sub set of data according to the other aspects of the invention.

The electronic device may furthermore be programmed to select segments from data files stored on a data carrier such as a floppy disc, CD, DVD, memory stick, credit card, mobile phone, PDA and so forth.

Furthermore according to another embodiment, the methods described herein may further comprises the step of selecting data segment according to at least one trailer requirement(s), in order to create a subset comprising data segments that describes a film or program in a comprehensible way.

Preferably the trailer requirement(s) comprises at least one requirement from one of the following classes:
- duration,
- continuity,
- priority,
- redundancy,
- exclusion,
- structural order requirements,
- temporal order requirements and
- product placement.

Wherein the requirements preferably are formalised in computable constraints so that they can be used in e.g. constrained optimisation problems.

It will be appreciated that features of the invention are susceptible to being combined in any combination without departing from the scope of the invention.

These and other aspects of the invention will be apparent from and elucidated with reference to the embodiments described hereinafter.

Embodiments of the invention will now be described, by way of example only, with reference to the following diagrams wherein.

Figures are preferably schematically drafted in order to facilitate the understanding of the invention. Therefore other designs that could be drafted in the same schematic way are implicitly also disclosed in this document.

Preferred embodiments together with some examples will be described in this section.

In this application some specific terms are used, below follows a description of these.

A broadcasting company may be any company that is able to provide consumers with information via any media such as TV, Radio, Internet and so forth.

Providers of content preferably relates to business entities that want to promote/market their products and/or services. For example a provider of content could be Nike, or Coca-Cola, BMW, Rolex and so forth.

Product placement data comprises data relating to a product or service that may be displayed. For example a scene in a film showing a pair of Nike shoes.

Data set preferably relates to an organised collection of data with a common theme.

A subset may be a set that is included in another set, which is called a superset.

A superset preferably has all the characteristics of the subset and additional characteristics.

Content data may be any kind of data that can be displayed/played to a viewer such as sounds, films, text, pictures, 3D world, virtual reality environments, music or other interactive content where product placement data may be used.

As described earlier the present invention relates to a method and system for generating revenues from providers of content data.

These providers may want to promote one or more of their products in a film therefore they may want an actor to use their products, such as a car, watch, or shoes in a film. Furthermore they may want an actor to eat or drink their product in a film.

A superset of data according to the invention may comprise a film, a computer game, a TV program, a radio program, an Internet lecture, an interactive flash presentation, and so forth.

In any of the above examples it is possible to place product placements in order to promote a product or service to viewers/consumers.

However, in some cases the purpose of product placements may not be aimed at needs for individuals, a product placement may be aimed at the needs of organisations and therefore product placement may be integrated in instruction films used for education of people in organisations and so forth.

Figure 1:
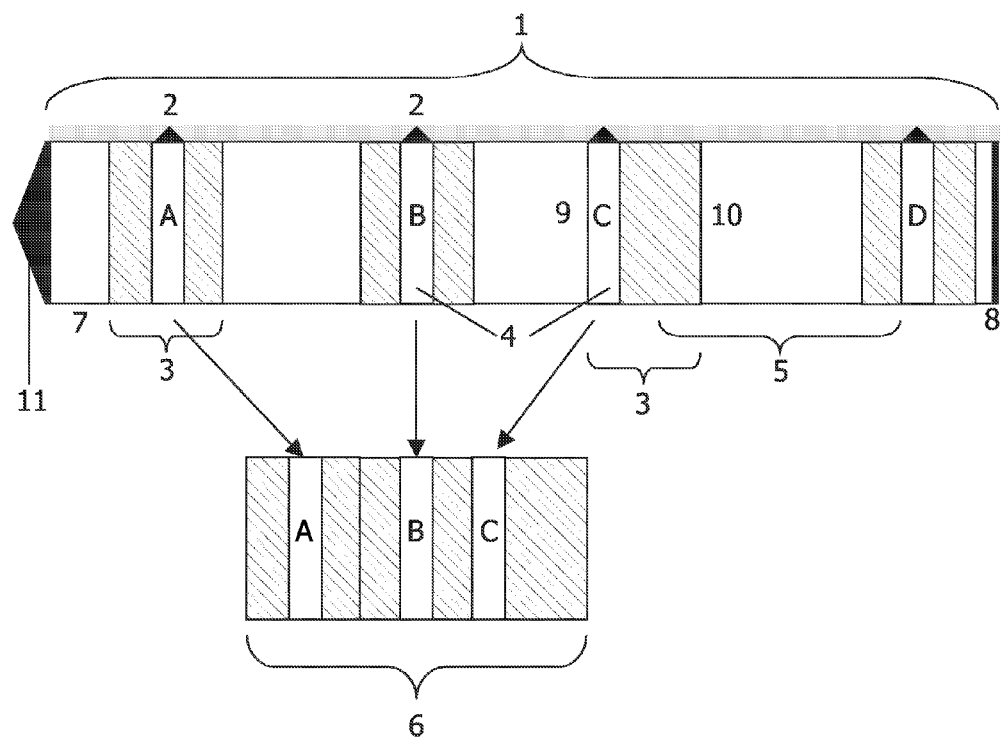
FIG. 1 shows an illustration of a superset of data comprising content data and tagged content data where some segments of the superset have been merged into a sub set of data.

FIG. 1 is an illustration of how a subset 6 of data may be created from a superset 1 of data. The superset of data comprises content data 5 and tagged content data 4. The tags may comprise metadata 2. Metadata 2 can exist for the entire duration of the superset and not only as shown in the figure. In the preferred embodiment subsets are created from segments where the metadata indicates commercial placements such as product placements and so forth.

Preferably the tags describe what information the content data comprises. This makes it possible for a software program or a user to find specific segments in the superset of data.

The tagging of the content data is preferably done manually by one or more persons that reviews e.g. a film or game and finds the positions of product placements. At this position he/she creates a tag that may comprise information such as: what product, product qualities, colours, context of product usage, who is the provider, to what kind of customer is the product suitable for, both professional and private, to extraverts but not to introverts, and so forth.

Also, the advertiser for the product can include a bid of how much they are interested in a particular kind of customer and whether all segments should be included or certain percentage (e.g. 50% of the appearances of the product for X amount of dollars, vs. 70% of the appearances should be included for X+Y amount of dollars.

Furthermore the tagging of the content data may be done automatically by running recognition software screening e.g. each picture in a move and using image recognition for finding logos or specific shapes of a product etc.

The superset 1 of data may be data representing a film, TV-program, computer game, radio program, or any other kind of media that can be represented by a data set.

Preferably the superset of data comprises sections of product placement data (A, B, C, D) these sections are preferably tagged content data 4. The sections A, B, C and D may relate to different types of products, for example the A section may relate to Nike shoes, the B section may relate to a car type such as Jeep, the C section may relate to Corn Flakes and the D section may relate to a watch type such as TagHeur.

When a subset of data is created, for example when a trailer is created from a film, segments 3 from the film are chosen to represent the film in the trailer, preferably the segments 3 are chosen according to a user profile.

The segments 3 that are chosen according to the user profile comprises at least the tagged content data 4. The tag 2 may comprise metadata describing the content data 4 and/or describing to which type of user/viewer the content data is suitable for. In this way the tagged content data 4 comprising the product placement can be matched with a user profile.

However, the chosen data segments 3 preferably comprises more data than just the tagged content data. Thus a one minute long trailer may comprise 10 seconds of product placement, the other 50 seconds contains other parts of the content data.

Thus the segments 3 that are chosen from the superset 1 may comprise both tagged content data 4 and "not tagged" content data 5 and/or the segments may contain only tagged content data or only "not tagged" content data.

As described earlier the whole length of the superset may be tagged with metadata, the expression "not tagged" above relates to parts of a superset that is not tagged with metadata comprising product placement tags.

The tagged content data in the chosen segments 3 may be in the beginning of the segment in the middle of the segment or in the end of the segment. Thus, how a segment 3 is extracted from the superset 1 may be based on what the content the data 5 in the vicinity of the tagged content data 4 comprises.

The superset of data may therefore further be tagged or marked so that a program will be able to find the borders 9 and 10 of the segments that are to be chosen.

In one embodiment the borders may be located by creating an external file comprising metadata that describes where in the superset the segments are located. This may be done by recording a start time for the beginning 9 of the segment and a stop time of the end 10 of a segment 3 from the start of the superset 7, or from the end 8 of the superset.

If other information has been included in the superset such as a commercial the start and stop time preferably is compensated with this difference or change in time. This information may also be located in an external file.

In another embodiment the metadata describing the location, start and stop time of the segments may be included as metadata 11 in the superset 1 of data.

An Example of a Superset Comprising a Film.

In this case the superset comprises all data that is related to this move e.g. sounds, pictures, voices, metadata and so forth.

A sub set of the superset may only comprise selected segments of the pictures and sounds from the film.

Superset Comprising a Flash Presentation

Another example is where a superset comprises an interactive flash presentation.

In this case the superset comprises all data that is related to the presentation e.g. sounds, films, text, pictures, PowerPoint presentations, graphs, questionnaires, and so forth.

Thus a subset may only comprise some of the most interesting PowerPoint's, and some of the sounds from the flash presentation, where product placements occur.

Superset Comprising a Game

In a further example the superset may comprise an Internet world/community or game where people are able to walk around with a character in a 3D computer world where it is possible to market products as in the real world such as on posters, sounds, and so forth.

Thus if the broadcasting company (in this case a company managing an Internet world) wants to make a commercial/trailer about the Internet World/community or game, the provider can choose to select pictures or films comprising product placements from this Internet world/community or game, and in this way promote the products/services for content provider that has product placements in this world/game.

Figure 2:
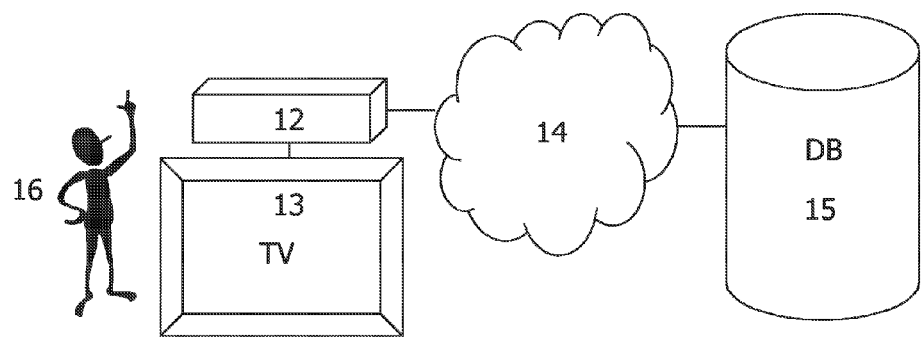
FIG. 2 shows an illustration of an embodiment of the system used in connection with the present invention.

FIG. 2 illustrates an embodiment of a system that may be used in connection with the present invention. The system preferably comprises an electronic device 12 such as a set top box, a display 13 such as a TV, the Internet or a computer network 14 and an online database 15 for storage of supersets of data, such as films, games, programs and so forth.

In another embodiment the electronic device is a mobile device such as a PDA a mobile phone and so forth. Preferably the mobile device is able to play multimedia such as films, music and sounds etc.

The electronic device may send a request over the Internet 14 in order to retrieve a superset (film) from the online database, the request is preferably triggered based on input from a user. Thereafter the superset is retrieved/downloaded and it may be stored in a memory in the electronic device.

From the retrieved/downloaded superset the electronic device may create a subset (Trailer) comprising segments from the superset stored in the memory.

In another embodiment the sent request may comprise the user profile and the subset may be created at an electronic network device such as a server comprising the database.

The display 13 may be any kind of display, such as a display on a mobile phone, a TV, a computer monitor, a projector and so forth.

Figure 3:
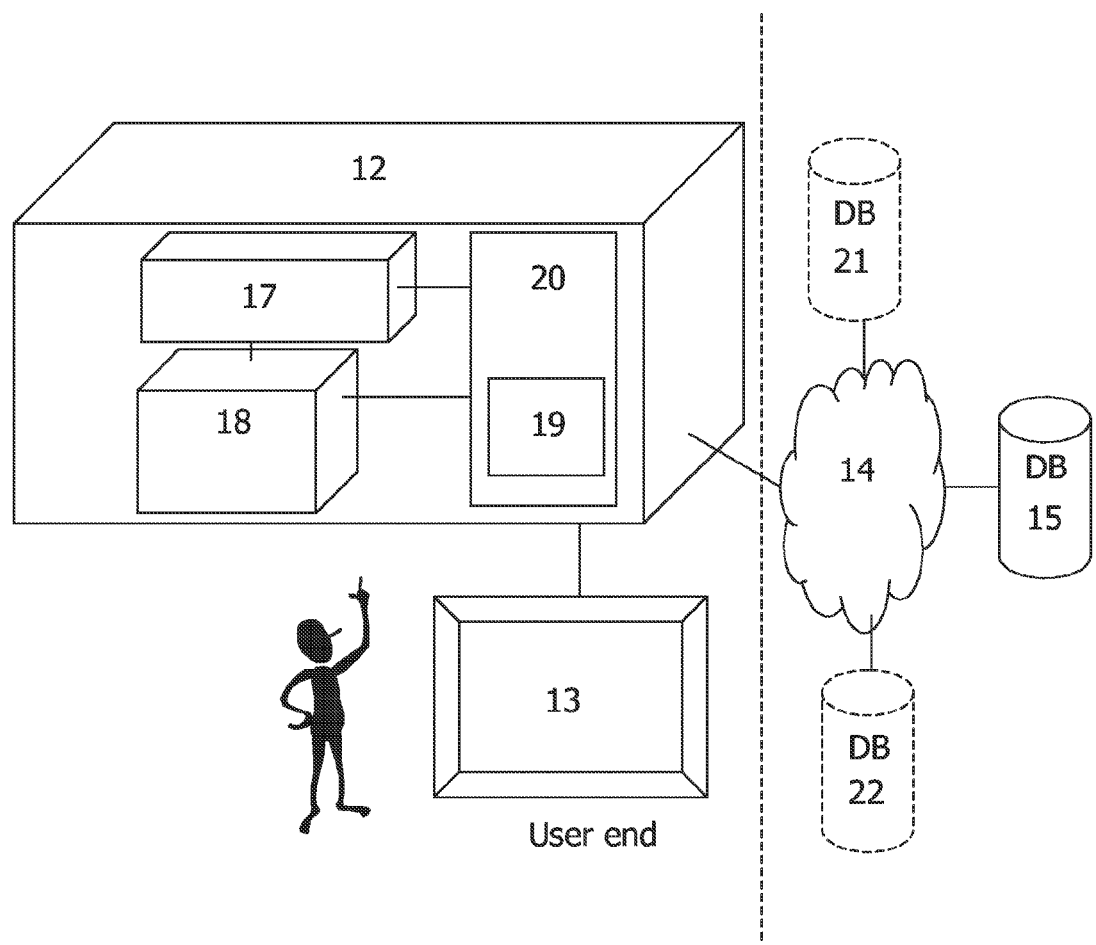
FIG. 3 is a schematic illustration of the system in FIG. 2 wherein some of the internal modules in the electronic device is shown.

FIG. 3 shows some of the internal software and hardware modules in the electronic device 12. Preferably the electronic device comprises a counter 17, a subset creator module 18, and a memory 20 comprising user profiles 19.

In order for a broadcaster company to keep track of how many of the product placements that has been selected or for how long the product placements has been shown, one or more counters may be used.

Thus, the counter 17 may be used for counting how many times a specific product placement has been shown to a user 16.

The value of the counter may either relate to an aggregated amount of time relating to the tagged content data, or it may relate to an aggregated number of times the tagged content data has been selected.

Thus the counter may either keep track of the number of times a product placement have been shown or selected, or the counter may keep track of the broadcasting time of a product placement.

One or more counters for each provider may be created in order to keep track of the product placement related to the provider.

Preferably the counter may be installed in the electronic device such as in a set top box, mobile phone, PDA, DVD player or the alike.

The value of the counter related to a specific product placement may be stored in the memory 20 of the electronic device and retrieved from the memory and sent to an online invoice database 21 at predetermined time intervals or according to a specific event such as when the electronic device connects to the Internet, or the user actively logs on to the Internet.

The predetermined time intervals may be once a day, once every week, once every month or it may be once every 6th hour, 12th hour, or at a specific date and so forth.

The subset creator is preferably a software module for creating a subset of data from a superset of data. For example the creator may create a trailer from a film as described below.

Trailer Generation

One of the main purposes of a trailer is to convey the essence of the original full-length film, sports program, talk show, game etc. to a viewer. Therefore, in order for a viewer to be able to understand the trailer, this process is preferably subject to a number of trailer requirements.

Trailer generation concerns the problem of selecting the best subset of segments of a given duration of the original program that satisfies a certain list of trailer requirements.

At least two approaches can be used for creating trailers: the machine learning approach and the knowledge explicit approach. In the machine learning approach a statistical classifier is trained with positive and negative examples, selected by humans, with the aim of generalising the common underlying properties of the examples in such a way that the classifier learns to distinguish between "good" previews and "bad" previews. This approach has the advantage of being generic and potentially reusable for all types of video and trailers.

In the knowledge-explicit approach, a designer preferably embeds requirements and constraints in an algorithm on how to make a trailer. The algorithm drives the search for finding the best subset of the original program and the composition of the trailer.

In order to allow a fast and convenient content selection a trailer should preferably meet more than thirty requirements that have been collected and grouped into eight categories.

However, less requirements may also be used such as between 1-5, 5-10, 10-20 or 20-30. It all depends on the quality that one want to achieve of the trailer.

The eight categories are:

Duration requirements deal with the durations of the trailer and of its subparts (subsets). Each segment chosen for the preview may have a minimum time required for comprehension depending on its type, complexity, an on the information it conveys.

Continuity requirements necessitate that a trailer should be as continuous as possible in order to avoid that a viewer experience abrupt "jumps".

Priority requirements indicate which content should be included in the trailer to convey as much information on the program as possible in the shortest amount of time. For example including close-ups on main actors as well as action segments and dialogues giving clues on the story line.

Uniqueness requirements aim at maximizing the efficiency of the trailer by minimising redundancy.

Exclusion requirements indicate which content should not be included in the trailer. For example a trailer should not include how the film or program ends etc.

Structural requirements dictate rules that pay attention to the structural properties of video. For example, in order to provide a good overview, a video preview should cover uniformly the entire program and mimic its original mood and tempo.

Temporal order requirement concerns the temporal order of the sequences included in the trailer. In this category, users have indicated conflicting requirements. Keeping the original order certainly helps users to understand the story line given the few clues provided by the preview. On the other hand changing the order prevents revealing too much of the story line in case users want to late view the entire content.

Product placement requirements concern what types of products and/or services that are in the film or program. Furthermore it may comprise requirements such as: product qualities, colours, context of product usage, who is the provider, to what kind/age/type of customer is the product suitable for, both professional and private, to extraverts but not to introverts, and so forth.

Preferably these requirements are formalised in computable constraints in order to be used to select a subset of segments from the original program that is admissible for being a trailer. At the same time, to create a good trailer it may be necessary to compare admissible sets of segments to select "the best" set, the importance score. The comparison may be based on a function that numerically estimates the value of a trailer. Given a computational model of the constrains and an importance score function to maximise, the problem of automatic generation of video previews is a constrained optimisation problem and its solution can be found with known methods such as constraint logic programming, local search techniques.

By following these trailer requirements it is ensured that the created trailer will convey the essence of the original full-length film etc., to a viewer so that the viewer can understand/get a hint about the content of the full-length film.

Thus the generation of a trailer comprising product placements may therefore be performed in two steps, namely the first step wherein segments are chosen according to trailer requirements and the second step wherein segments are chosen according to a user profile. These two steps may also be integrated in each other and thus not distinct from each other.

Hence, in another embodiment the process of creating a trailer further comprises the steps of creating a trailer according to trailer requirements.

Thus in this embodiment metadata may be matched with a user profile while satisfying the trailer requirements for trailer generation. If the trailer requirements are not meet, the trailer of a James Bond film would only have a BMW car in it and that trailer would not convey the essence of the film.

Therefore the additional constraints for making a trailered commercial will preferably add to the weights applied to the selection of segments for a trailer.

For example, given a list of segments with almost equal priority, the ones that have product placement in them that satisfy the commercial requirements (fit to a user profile and/or highest bid from product provider), are added and merged into a trailer.

Creation of Constraints and Model

Below follows an example of how a trailer may be created, where listed requirements are mapped to a part of an objective function or to a constraint that the trailer preferably should fulfil.

In formalising the problem off automatic trailer generation, the original program can be seen as a finite sequence of successive video segments, with synchronised audio and subtitle $V=v_1 \ldots v_M$ where $v_i$ is the i-th video segment in the original program. M depends on the original program duration and on the actual segmentation. The desired trailer can be represented as a finite sequence of successive positions that can be taken by any video segment belonging to the original program: $S=s_1 \ldots s_N$ where $s_j$ is the j-th position in the trailer. N depends on the duration of the trailer that is fixed by the user to a certain amount D:

$$\sum_{j=1}^{N} \text{durations}(s_j) \leq D.$$

The duration of each video segment should not be shorter than a certain minimum amount, to be understandable out of its original context and, at the same time, it should not be longer than a certain maximum value in order not to give away too many details of the story. This can be formalised by requiring: $d_{min} \leq \text{durations}(s_j) \leq d_{max}$.

The objective function whose absolute maximum denotes the best trailer, may have the following structure:

$$\text{eval}(S)=\alpha^*\pi(S)-\beta^*\rho(S)+\gamma^*\eta(S)+\delta^*\omega(S) \quad (1)$$

In (1) the priority requirements are taken into consideration in $\pi(S)$ that is defined as:

$$\pi(S) = \sum_{j=1}^{N} \pi(s_j) \quad (2)$$

where $\pi(s_j)$ is the priority score of segment $s_j$ and it is defined as follows:

$$\pi(s_j)=w^*A(s_j) \quad (3)$$

in which w preferably is a vector of weighting factors and $A(s_j)$ is a column vector of attributes associated to segment $s_j$ in the range [0 . . . 1]. These attributes may be computed by applying several low- and mid-level content analysis algorithms such as: computation of contrast, audio loudness, detection of action, faces, dialogues, music/speech/noise/silence, and camera motion. The relative importance of the various attributes can be linearly tuned using the weighting factors w.

The term $\rho(S)$ in equation (1) estimates the degree of redundancy of the trailer that in this example has a negative sign, which means that it promote uniqueness and penalise redundancy. It is defined as a linear combination of visual and textual redundancy:

$$\rho(S) = \beta_1 * \sum_{i=1}^{N-1} \sum_{j=i+1}^{N} \sigma_v(s_i, s_j) + \beta_2 * \sum_{i=1}^{N-1} \sum_{j=i+1}^{N} \sigma_t(s_i, s_j) \quad (4)$$

where $\sigma_v(s_i,s_j)$ represent the visual similarity of segments $s_i$ and $s_j$ and is computed based on automatically extracted visual features. Textual redundancy is measured by extracting keywords in the close captions or in the speech transcript, $\rho(S)$, and by counting the number of times they are repeated in the trailer segments:

$$\sigma_t(s_i,s_j)=|K(s_i) \cap K(s_j)| \quad (5)$$

The continuity requirements can be taken into account by considering the shots as elementary segments constituting the program. The shot boundaries can be found by performing shot cut detection. Additionally, sentences should be included entirely and not be abruptly cut while subtitles should be displayed for a sufficient amount of time to be read. If we represent the synchronised audio stream A as $A=a_1 \ldots a_Q$ (a being the j-th audio segment and Q the number of audio segments), the synchronised subtitles C as $C=c_1 \ldots c_R$ ($c_k$ being the k-th subtitle and R the total number of subtitles), and we indicate with $b_s$, $e_s$, and $\Delta_s$ respectively the start time, the end time and the time-span of the video, audio or subtitle segment s, the continuity requirement of including complete audio segments can be formalised with the following constraints (this example applies to subtitles):

$$\forall s \in S(\forall a:e_a \in \Delta_s, b_a \in \Delta_s) \wedge (\forall a:b_a \in \Delta_s, e_a \in \Delta_s) \quad (6)$$

The structural requirement of uniform coverage of the whole program can be fulfilled by considering a segmentation of the program into L different scenes ($U_j$, j=[1 . . . L]) and maximising $\eta(S)$ in equation (1) that is the product of the relative duration of the selected segments belonging to each scene:

$$\eta(S) = \sqrt[L]{\prod_{j=1}^{L} \frac{\sum_{s \in U_j} \text{duration}(s)}{\text{duratio}(U_j)}} \quad (7)$$

Scene boundaries may be computed using a time-constrained clustering procedure.

Temporal order requirements different from the original order are taken into consideration in the term $\omega(S)$ of equation (1). For example, to generate a trailer having all the action segments at the end, ω(S) may be defined as follows:

$$\omega(S) = \sum_{i=1}^{N} i * \text{action}(s_i) \quad (8)$$

where action($s_i$) indicates whether segment $s_i$ is classified as action segment. The original order constraint is implicitly solved during optimisation by keeping the video segments chronologically ordered.

The weights α, β, γ and δ in (1) allow personalising the generation of the preview by changing the relative impact of the different types of requirements on the value of the objective function.

Implementation

The generation of a trailer may be divided into four main steps
  audio and video feature extraction.
  audio and video segmentation and classification
  segments selection.
  preview composition.

Audio and Video Feature Extraction

Various algorithms may be applied to the audio and video signals to extract the features required by the next steps and for computing the priority score according to equation (3) after normalisation over the entire video. Video features include low-lever attributes such as contrast, color distribution, motion activity and mid-level attributes such as face location and size, camera motion, and so forth.

Audio features may include RMS value, spectral centroid, bandwidth, zero-crossing rate, MFCC and so forth.

Audio and video segmentation and classification.

This step can be divided into five sub-steps:
  Shot segmentation and clustering: a standard shot cut detection algorithm may be applied to divide the video stream into continuous shots. Time-constrained clustering is then applied to group together visually consistent shots that are not far apart in time.
  Audio classification: the synchronised audio stream is classified into coherent audio classes such as silence, speech, music, noise etc.
  Micro-segmentation: segment exceeding the maximum duration after the shot segmentation are further divided into sub-segments with durations bigger than $d_{min}$ and with boundaries possibly aligned with content-based clues such as: a change in the audio class, appearance or disappearance of a detected face, a change in camera motion or object motion. The micro-segmentation step may be easily formalised as an integer linear programming problem and solved with standard methods such as the simplex method.
  Segment compensation: successive segments violating constraint (6) are merged until the continuity requirement is fulfilled without violating the maximum segment duration $d_{max}$. When this is not possible, the segmentation induced by the audio classifier is used as primary instead of the shot-based one.
  Pre-filtering: commercial detection may be performed over the entire video and the detected commercials may be discarded from the set of segments available for the generation of the trailer. However this commercial detection is different from product placement detection, since product placements preferably should be present in the created trailer.

Segments Selection

Preferably the segment selection step comprises the steps of searching the best set of segments that maximise the objective function (1) in the space of all possible previews. The space of all possible previews may be explored using a local search method such as simulated annealing or a generic algorithm since preferably at this pint each requirement or constraint has either been solved in the previous steps or it is mapped to a priority or penalty score term in the objective function (1).

Preview Composition

This step preferably consists of the actual composition of the preview by fusing the selected segments into one continuous audio-visual stream, this audio-visual stream may be called a second level superset extracted from the superset of data.

Abrupt audio and video transitions between segments may be smoothed using dissolve effects.

Thus in one embodiment the subset creator may scan a superset of data and reads the tags comprising metadata about the content of the superset of data. Thereafter the creator matches the metadata in the tags and data from at least one user profile 19 stored in the memory 20. The creator selects segments of the superset based on the matches and combines the selected segments into a subset of data. The subset of data may thereafter be stored in the memory for later retrieval or preferably the subset is played/displayed on the display 13.

In another embodiment the subset creator scans a superset of data and reads the tags comprising metadata and compare the information found in the metadata with trailer requirements as described above, so that segments representing the superset of data is chosen.

Thereafter the trailer creator may create relations between the chosen segments so that all possible combinations according to the trailer requirements are recorded and stored either temporarily or in a file for later use. Furthermore the segments may be given priorities so that they can be classified and grouped.

The trailer creator may create a second level of data supersets wherein the second level supersets comprises the segments chosen according to the trailer requirements. For example the set of segments that maximise the objective function (1).

Since an objective function may have many solutions, the segments may be combined in many ways according to the trailer requirements, thus there may be many second level supersets to work with.

However, these second level supersets may be weighted according to the importance score and only a few of them having a score above a predefined threshold value may be chosen. The importance score may be the value of the objective function (1)

The trailer creator may from these second level supersets, match the metadata in the tags and data from at least one user profile 19 stored in the memory 20, and the most suitable combination of segments according to the match are selected and combined into a subset of data. The subset of data may thereafter be stored in the memory for later retrieval or preferably the subset is played/displayed on the display 13.

Furthermore according to a third embodiment the subset creator may scan a superset of data and reads the tags comprising metadata and compare the information found in the metadata with the trailer requirements as described above.

In this embodiment the user profile may be considered at the same time as the trailer requirements and thus become restrictions and be included as a part of the objective function (1).

The memory 20 preferably comprises one or more user profiles 19. The user profiles may be used for selecting segments of the superset of data so that the most suitable segment is selected for the user related to the user profile. In order to create the user profile the system may need to receive some input from the user 16.

Therefore a set-up page for creating a user profile related to an electronic device may be used in connection with the invention. For example when the device 12 is used for the first time a user 16 may be asked to input information that may be used to create the user profile. If a user chooses not to input any information default values will apply, and the user can access the set-up page at a later time for inputting the information.

Some of the default values may be changed automatically when the device is connected to the Internet since the device preferably comprises an IP address that can be traced on the Internet. In this way information such as the geographical location can be inputted in to the user profile.

As described above the user profile may be stored in a memory 20 of an electronic device 12 (set top box, CD, DVD, game console) that preferably is located at the location of the user 16. However the user profile may also be stored in an online database so that it is accessible via the Internet.

In alternative embodiments the user profile 19 can be updated by sending an SMS, email or any other electronic message to a system comprising a software module able to extract the information from the message and store the information in a user profile. The user profile may be stored on an online database or in a memory of an electronic device connected to the Internet and located at a users location.

Furthermore, in an alternative embodiment a user may access a web page comprising a form wherein he/she can input information for the user profile. The form may be sent as an electronic message and stored on an online database or in a memory of an electronic device connected to the Internet and located at a users location According to the preferred embodiment of the invention the chosen segments comprises product placement data.

Furthermore, the data segments in the superset of data may be selected according to a user profile, since product placement may relate to a specific customer segment the creation of a subset of data from a superset of data is preferably based on input related to the user that will watch the subset of data.

Furthermore, the providers of the product placements will be ensured that, even if the viewer decides not to see the film, the viewer would have watched their product in the trailer that was generated In the above description the term "comprising" does not exclude other elements or steps and "a" or "an" does not exclude a plurality.

Furthermore the terms "include" and "contain" does not exclude other elements or steps.

In summary, the invention relates to the following.

This invention relates to a method and computer system for automatic generation of trailers. More specifically it relates to a method for generating revenues from providers of content data. The method generally comprises the steps of finding product placement data in a super set of data. When these product placements have been found they are preferably matched with a user profile and segments, of the superset comprising these product placements with a positive match, are selected and merged into a subset of data. A counter may keep track of which product placement that has been chosen and how many times a product placement has been chosen and viewed. Based on the value of the counter an invoice is created.

The invention claimed is:

1. A method of creating a sub set of data that includes data segments from a superset of data that corresponds to a media program stored in a database, the superset of data including (i) content data that is not tagged with metadata, and (ii) content data tagged with metadata and further including product placement data corresponding to product placements, the method comprising:
    detecting, via an electronic device, data segments that comprise at least the tagged content data in the superset of data based on a desired metadata;
    selecting, via the electronic device, one or more of the detected data segments of a given duration of the media program (i) according to at least one user profile of at least one viewer and (ii) that satisfies at least one trailer requirement; and
    combining, via a subset creator module of the electronic device, the one or more selected data segments to form the sub set of data, wherein the sub set of data comprises a trailer of the media program that (i) describes the media program in a comprehensible way, (ii) includes product placements matched with the at least one user profile that is configured to promote a product or service to the at least one viewer in response to being displayed or played back to the at least one viewer, and (iii) ensures an exposure time of the product placements via the trailer without editing the media program.

2. A method of generating revenues from providers of content data in a superset of data, comprising the method as claimed in claim 1 and further comprising:
    for each tagged content data in the one or more selected data segments, increasing a value of a counter related to the tagged content data;
    displaying, via a display device, the sub set of data to a user; and
    storing the values of the counters in a memory for later retrieval,
    wherein the values stored in the memory are used, via an invoice database, for generating invoices to the providers of product placements.

3. The method according to claim 1, wherein the content data relates to any media selected from the group consisting of:
    films,
    games,
    Tv,
    radio, and
    Internet.

4. The method according to claim 2, wherein the value of the counter relates to an aggregated amount of time relating to the tagged content data, and/or the value relates to an aggregated number of times the tagged content data has been selected.

5. The method according to claim 1, wherein the user profile comprises at least one of the following data:
    gender,
    age,
    habits,
    area,
    time,
    content provider,
    broadcaster settings, and
    personality traits.

6. The method according to claim 1, wherein the tagged content data is product placement data.

7. The method of creating a sub set of data that includes data segments from a superset of data according to claim 1, the method further comprising:
- recording, via the electronic device, a start and a stop time for the detected data segments in the superset of data;
- selecting, via the electronic device, one or more of the detected data segments based on a user profile; and
- combining, via the subset creator module of the electronic device, the one or more selected data segments based on the start and stop time so as to form the sub set of data.

8. A method according to claim 7, wherein the superset of data further comprises non-program data, the method further comprising:
- detecting, via the electronic device, the non-program data; and
- while considering the detected non-program data, estimating, via the electronic device, a start and a stop time for the detected data segments in the superset of data; and
- combining, via the subset creator module of the electronic device, the selected data segments based on the estimated start and stop time so as to form the sub set of data.

9. The method according to claim 1, wherein fingerprint metadata is used for describing one or more data segments of the superset of data, the method further comprising:
- matching, via the electronic device, a fingerprint metadata and a data segment;
- selecting, via the electronic device, the matched data segment in response to a match; and
- combining, via the subset creator module of the electronic device, one or more selected data segments so as to form the sub set of data.

10. The method according to claim 9, wherein the fingerprint metadata is stored on a separate database.

11. The method according to claim 9, wherein the finger print metadata comprises:
- audio fingerprint data,
- video fingerprint data, and
- text fingerprint data, and wherein the matching, via the electronic device, further comprises:
- text fingerprint matching,
- audio fingerprint matching, and
- visual fingerprint matching.

12. The method according to claim 1, further comprising: selecting, via the electronic device, the one or more data segment according to the at least one trailer requirement.

13. The method according to claim 12, wherein the at least one trailer requirement comprises at least one requirement selected from one of the following classes:
- duration,
- continuity,
- priority,
- redundancy,
- exclusion,
- structural order requirements,
- temporal order requirements, and
- product placement.

14. A computer system for creating a sub set of data that includes data segments from a superset of data that corresponds to a media program, the superset of data including (i) content data that is not tagged with metadata and (ii) content data tagged with metadata and further including product placement data corresponding to product placements, the computer system comprising:
- an electronic device that includes a memory;
- a database that includes at least one superset of data;
- a computer network; and
- at least one network connection,
- wherein the electronic device is programmed to:
  - request data segments of the superset of data stored in the database over the at least one network connection,
  - select at least one data segment that comprises tagged content data of a given duration of the media program (i) according to a user profile of at least one viewer stored in the memory, and (ii) that satisfies at least one trailer requirement; and
  - combine the at least one selected data segment to form the sub set of data, wherein the sub set of data comprises a trailer of the media program that (i) describes the media program in a comprehensible way, (ii) includes product placements matched with the user profile that is configured to promote a product or service to the at least one viewer in response to being displayed or played back to the at least one viewer, and (iii) ensures an exposure time of the product placements via the trailer without editing the media program.

15. An electronic device comprising, at least one processor, at least one memory that includes one or more user profiles of at least one viewer, at least one output, and at least one connection for receiving and/or sending data, the electronic device being programmed to:
- request data that includes data segments from a superset of data that corresponds to a media program, the superset of data including (i) content data that is not tagged with metadata and (ii) content data tagged with metadata and further including product placement data corresponding to product placements, via the connection for receiving data,
- select at least one of the data segment that comprises tagged content data of a given duration of the media program (i) according to the user profile of the at least one viewer, and (ii) that satisfies at least one trailer requirement, and
- combine the at least one selected data segment to form the sub set of data, wherein the sub set of data comprises a trailer of the media program that (i) describes the media program in a comprehensible way, (ii) includes product placements matched with the user profile that is configured to promote a product or service to the at least one viewer in response to being displayed or played back to the at least one viewer, and (iii) ensures an exposure time of the product placements via the trailer without editing the media program, and
- provide the sub set of data to the output.

16. The electronic device according to claim 15, wherein the electronic device further being programmed to select data segments from data files.

* * * * *